United States Patent
Huang et al.

(10) Patent No.: US 10,624,124 B2
(45) Date of Patent: *Apr. 14, 2020

(54) TRIGGER FRAME RECOVERY

(71) Applicant: Intel IP Corporation, Santa Clara, CA (US)

(72) Inventors: Po-Kai Huang, San Jose, CA (US); Yaron Alpert, Hod Hasharoni (IL); Laurent Cariou, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,006

(22) Filed: Dec. 17, 2018

(65) Prior Publication Data

US 2019/0230020 A1 Jul. 25, 2019

Related U.S. Application Data

(63) Continuation of application No. 15/197,317, filed on Jun. 29, 2016, now Pat. No. 10,181,996.

(Continued)

(51) Int. Cl.
*H04W 74/02* (2009.01)
*H04W 74/08* (2009.01)
(Continued)

(52) U.S. Cl.
CPC ............ *H04W 74/02* (2013.01); *H04L 43/16* (2013.01); *H04W 72/042* (2013.01); *H04W 74/0816* (2013.01); *H04W 84/12* (2013.01)

(58) Field of Classification Search
CPC ............... H04W 72/042; H04W 74/02; H04W 74/0816
See application file for complete search history.

(56) References Cited

U.S. PATENT DOCUMENTS 10,181,996 B2  1/2019  Huang et al.
2015/0358067 A1*  12/2015  Zhang ............... H04W 52/0216
370/315

(Continued)

OTHER PUBLICATIONS

"U.S. Appl. No. 15/197,317, Examiner Interview Summary dated Jul. 30, 2018", 3 pgs.

(Continued)

*Primary Examiner* — Marcus Smith
(74) *Attorney, Agent, or Firm* — Schwegman Lundberg & Woessner, P.A.

(57) ABSTRACT

Methods, computer readable media, and wireless apparatuses are disclosed for trigger frame recovery. An apparatus of a wireless device is disclosed. The apparatus comprising processing circuitry configured to: encode a trigger frame comprising a resource allocation for one or more stations, where the trigger frame comprises a network allocation vector (NAV) duration. The processing circuitry may be further configured to configure the wireless device to transmit the trigger frame to the one or more stations. The processing circuitry may be further configured to configure the wireless device to contend for the wireless medium a first time, encode a retransmission of the trigger frame, and configure the wireless device to transmit the retransmission of the trigger frame to the one or more stations, if a frame is not received from the one or more stations in response to the trigger frame before a trigger frame timeout duration.

20 Claims, 8 Drawing Sheets

Related U.S. Application Data

(60) Provisional application No. 62/294,353, filed on Feb. 12, 2016.

(51) Int. Cl.
    *H04L 12/26*     (2006.01)
    *H04W 84/12*     (2009.01)
    *H04W 72/04*     (2009.01)

(56) References Cited

U.S. PATENT DOCUMENTS

| | | |
|---|---|---|
| 2016/0316458 A1* | 10/2016 | Kwon ................. H04L 27/2601 |
| 2016/0381596 A1* | 12/2016 | Hu ..................... H04B 7/18504 |
| | | 370/236 |
| 2017/0064708 A1 | 3/2017 | Noh et al. |
| 2017/0094685 A1 | 3/2017 | Noh et al. |
| 2017/0238310 A1 | 8/2017 | Huang et al. |
| 2017/0272138 A1 | 9/2017 | Chun et al. |
| 2018/0146476 A1 | 5/2018 | Kim et al. |

OTHER PUBLICATIONS

"U.S. Appl. No. 15/197,317, Non Final Office Action dated Jun. 1, 2018", 12 pgs.

"U.S. Appl. No. 15/197,317, Notice of Allowance dated Sep. 11, 2018", 6 pgs.

"U.S. Appl. No. 15/197,317, Response filed Jul. 25, 2018 to Non Final Office Action dated Jun. 1, 2018", 11 pgs.

\* cited by examiner

TRIGGER FRAME RECOVERY

PRIORITY CLAIM

This application is a continuation of U.S. patent application Ser. No. 15/197,317, filed Jun. 29, 2017, which claims the benefit of priority under 35 U.S.C. 119(e) to U.S. Provisional Patent Application Ser. No. 62/294,353, filed Feb. 12, 2016, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for trigger frame recovery.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
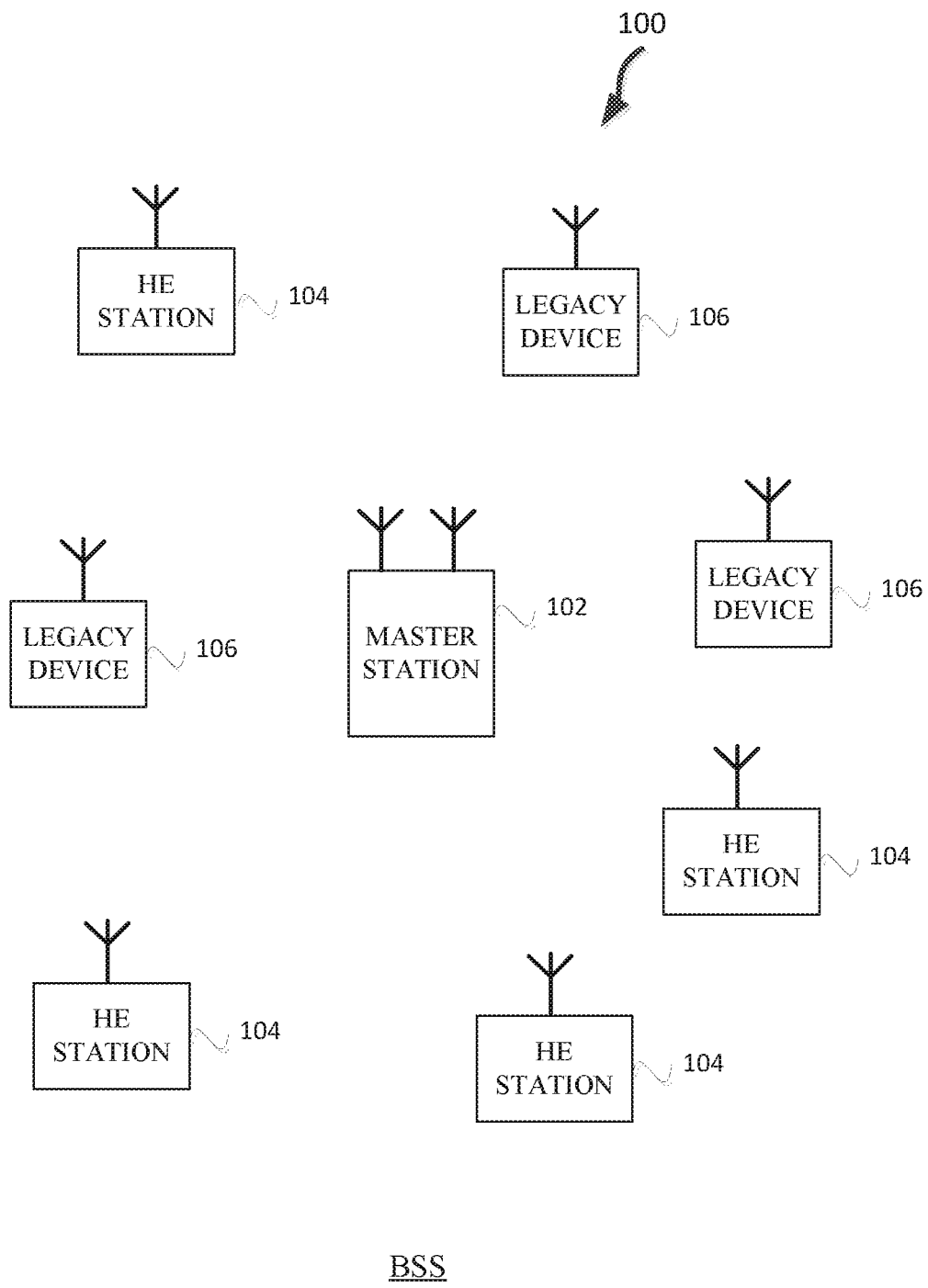
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency (HE) (e.g., IEEE 802.11ax) stations 104, and a plurality of legacy (e.g., IEEE 802.11n/ac) devices 106.

The master station 102 may be an AP using one of the IEEE 802.11 protocols to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 and/or HE station 104 may use one or both of MU-MIMO and OFDMA. There may be more than one master station 102 that is part of an extended service set (ESS). A controller (not illustrated) may store information that is common to the more than one master station 102. The controller may have access to an external network such as the Internet.

The legacy devices 106 may operate in accordance with one or more of IEEE 802.11 a/b/g/n/ac/ad/af/ah/aj, or another legacy wireless communication standard. The legacy devices 106 may be STAs or IEEE 802.11 STAs. The HE stations 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11 ax or another wireless protocol such as IEEE 802.11 az. In some embodiments, the HE stations 104, master station 102, and/or legacy devices 106 may be termed wireless devices. In some embodiments the HE station 104 may be a "group owner" (GO) for peer-to-peer modes of operation where the HE station 104 may perform some operations of a master station 102.

The master station 102 may communicate with legacy devices 106 in accordance with legacy IEEE 802.11 communication techniques. In example embodiments, the master station 102 may also be configured to communicate with HE stations 104 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20 MHz. In some embodiments the bandwidth of the channels are 26, 52, 104, 242, etc. active data subcarriers or tones that are space 20 MHz apart. In some embodiments the bandwidth of the channels is 256 tones spaced by 20 MHz. In some embodiments a 20 MHz channel may comprise 256 tones for a 256 point Fast Fourier Transform (FFT). In some embodiments, a different number of tones is used.

A HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 102, HE station 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and channel information. During the HE control period, HE stations 104 may communicate with the master station 102 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a channel smaller than the operating range of the master station 102. During the HE control period, legacy stations refrain from communicating.

In accordance with some embodiments, during the master-sync transmission the HE STAs 104 may contend for the wireless medium with the legacy devices 106 being excluded from contending for the wireless medium during the master-sync transmission or TXOP. In some embodiments the trigger frame may indicate an uplink (UL) UL-MU-MIMO and/or UL OFDMA control period. In some embodiments, the trigger frame may indicate a portions of the TXOP that are contention based for some HE station 104 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the HE device 104 and/or the master station 102 are configured to perform the methods and operations herein described in conjunction with FIGS. 1-7.

Figure 2:
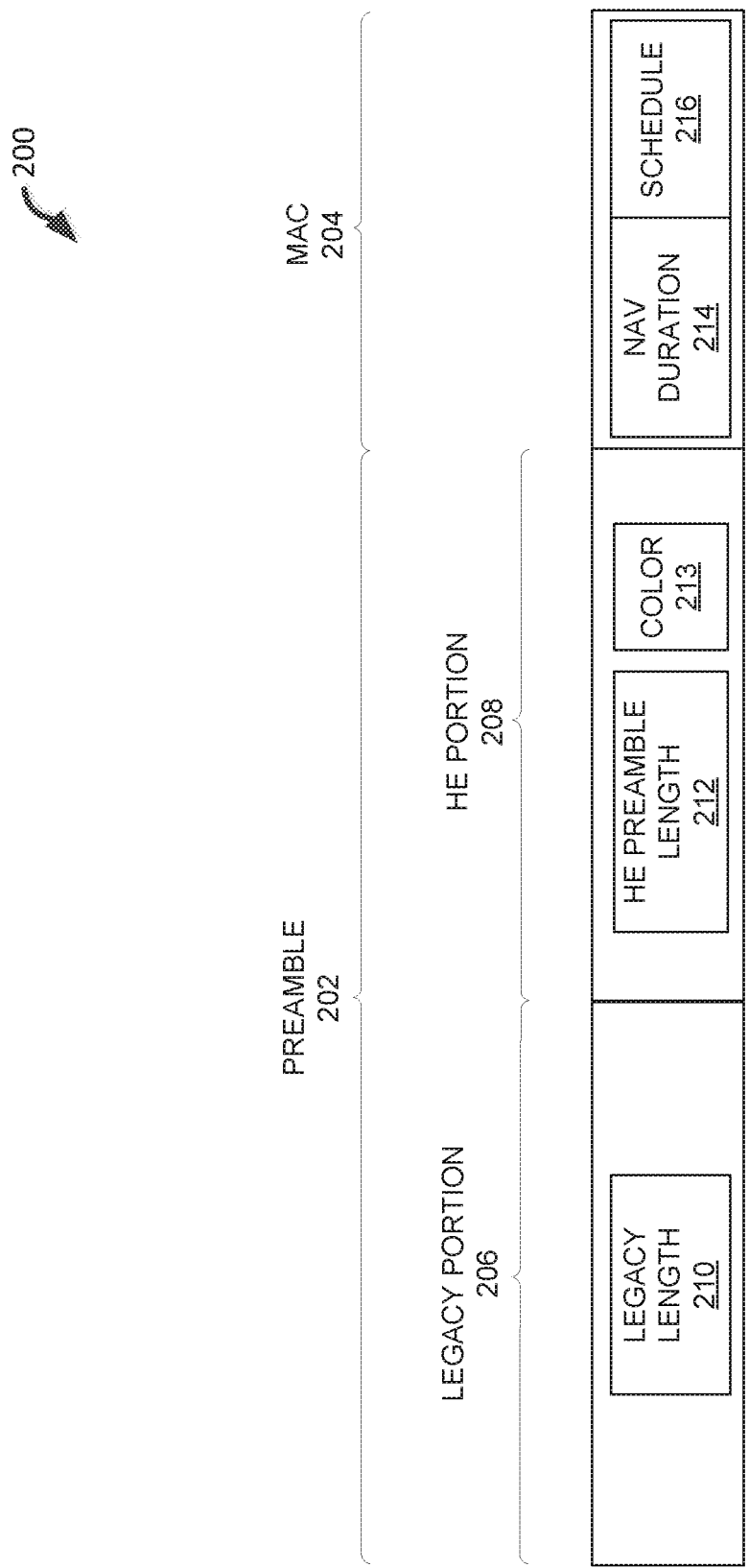
FIG. 2 illustrates a trigger frame in accordance with some embodiments.

FIG. 2 illustrates a trigger frame 200 in accordance with some embodiments. The trigger frame 200 may be a HE trigger frame 200. The trigger frame 200 may be a UL MU data trigger frame. The trigger frame 200 may be a DL MU data trigger frame. The trigger frame 200 may be a MU block acknowledgement (BA) frame. The trigger frame 200 may be a MU request-to-send (RTS) frame. The trigger frame 200 may be a beamforming report trigger.

The trigger frame 200 comprises a preamble 202 and media access control (MAC) 204. The preamble 202 comprises a legacy portion 206 and a HE portion 208. The legacy portion 206 comprises a legacy length 210 field. For example, the legacy length 210 field may be a field of a high-throughput (HT) header that includes a (HT) length of 18 bits that indicates the number of bytes of the physical layer convergence protocol (PLCP) frame. The legacy portion 206 may have additional legacy lengths 210 associated with different IEEE 802.11 protocols.

The HE portion 208 may comprise a HE preamble length 212 and a BSS color 213. The HE preamble length 212 field may be a length in the HE-SIG-A (not illustrated) which may be 7 bits and indicate a number of bytes. The MAC 204 may include a NAV duration 214 and a schedule 216. The NAV duration 214 may indicate a length field. For example, the length field may be associated with a UL or DL TXOP that the trigger frame 200 may start. The schedule 216 field may be an indication of resource allocations for one or more HEW stations 104. One or more of the legacy length 210 field, the HE preamble length 212 field, and/or the NAV duration 214 field may indicate a length or duration that begins after the trigger frame 200 for other wireless devices to set a NAV that are not referenced in the schedule 216.

The BSS color 213 may be a color of a BSS 100. In some embodiments, BSS color 213 may be used to indicate that a HE station 104 and/or master station 102 should decode the MAC portion of the frame even if the BSS color 213 does not match a BSS color 213 of the BSS that the HE station 104 is attached to.

Figure 3:
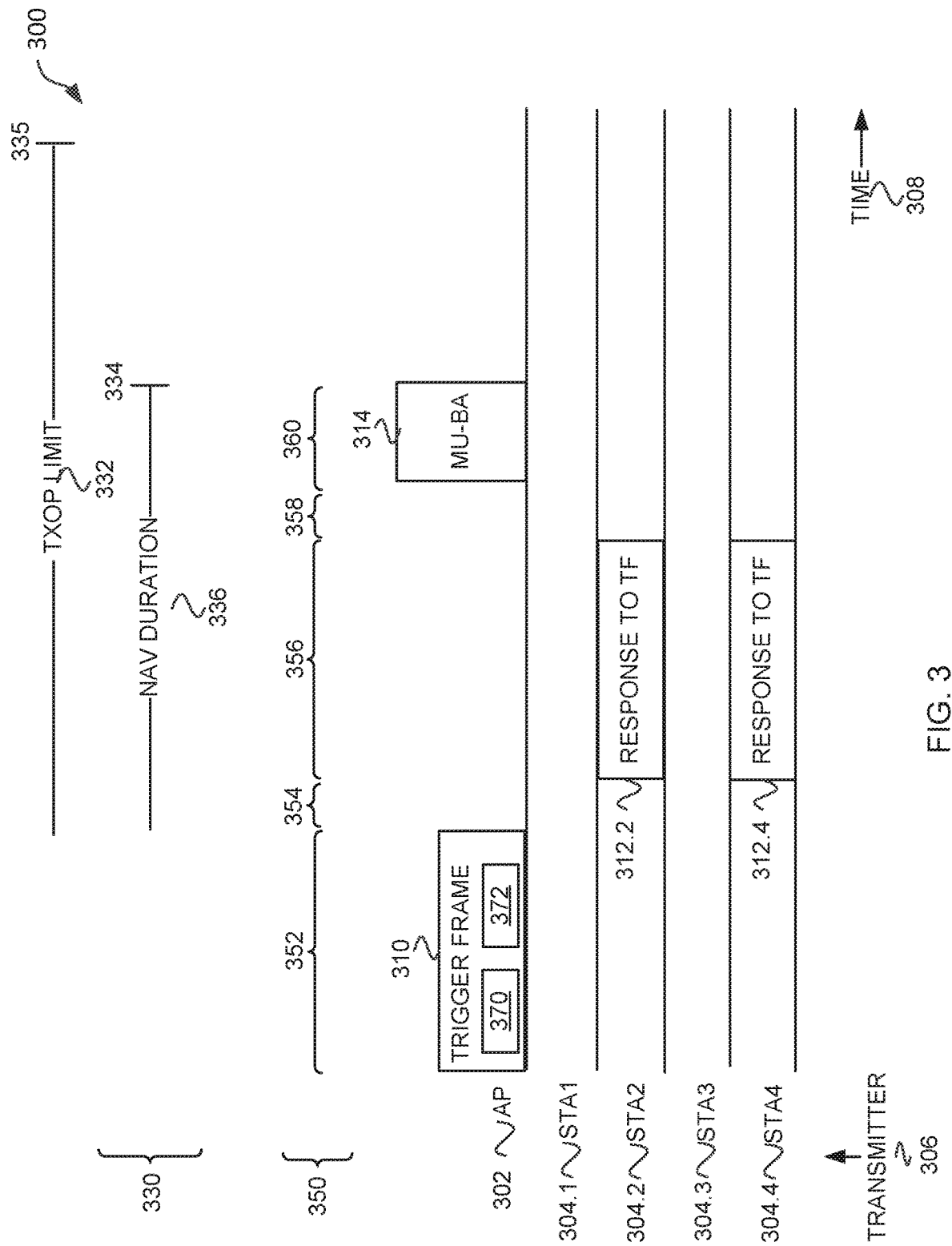
FIG. 3 illustrates a method for recovery methods for a trigger frame in accordance with some embodiments.

FIG. 3 illustrates a method 300 for recovery methods for a trigger frame 310 in accordance with some embodiments. Illustrated in FIG. 3 is time 308 along a horizontal axis, transmitter 306 along a vertical axis, operation 350 along the top, and durations 330 along the top. AP 302 may be a master station 102. The STAs 304 may be HE station 104. The AP 302 may be a HE station 104.

The method 300 begins at operation 352 with the AP 302 transmitting trigger frame 310. The trigger frame 310 may include a NAV duration 370 field and a schedule 372 field. The NAV duration 370 field may indicate NAV duration 336 that the AP 302 is setting for responses 312 and MU-BA 314.

The AP 302 may be granted a TXOP after contending for the wireless medium (not illustrated), transmitting the trigger frame 310, and receiving a response 312. The TXOP may last up to the TXOP limit 332. The AP 302 may continue the TXOP past the NAV duration 336 without contending for the medium up to the TXOP limit 332, which may extend to a time 335.

The NAV duration 370 field may extend further past time 334 to permit additional UL or DL operations. The schedule 372 field may include a resource allocation and transmission parameters for one or more of the STAs 304 to use to transmit UL data 312. In example embodiments, the schedule 372 field includes a resource allocation for STA2 304.2, STA3 304.3, and STA4 304.4. STA2 304.2, STA 304.4 receive the trigger frame 310. STA3 304.3 does not successfully decode the trigger frame 310. The trigger frame 310 may be a multi-user (MU) block acknowledgement request (BARXMU-BAR) trigger frame, MU request-to-send (RTS) (MU-RTS) trigger frame, beamforming request trigger frame, a beamforming report poll trigger frame, or a MU uplink (UL) data trigger frame.

The method 300 continues at operation 354 with STA2 304.2 and STA4 304.4 waiting a duration before transmitting. The duration may be a short interframe space (SIFS) or another duration.

The method 300 continues at operation 356 with STA2 304.2 and STA4 304.4 transmitting response to TF 312.2, 312.4, respectively. The AP 302 receives the response to TF 312.2, 312.4. Upon receiving a response to TF 312, the AP 302 is granted the TXOP, which may continue for up to time 335. The AP 302 may determine that the response to TF 312.2, 312.4 is an acknowledgment of the trigger frame 310 since the response to TF 312.2, 312.4 is in accordance with the schedule 372. The AP 302 may receive just one of the responses to TF 312.2, 312.4 to consider the response to TF 312 as an acknowledgment of the trigger frame 310.

The response to TF 312 may be a response to the trigger frame 310 in accordance with the type of trigger frame. For example, in response to a UL MU data trigger frame, the response to TF 312 may be UL data. In response to a MU-BA trigger frame, the response to TF 312 may be BAs of frames the AP 302 transmitted to the STAs 304. In response to a MU-RTS trigger frame, the response to TF 312 may be MU-clear-to-send (CTS). In response to a beamforming report trigger frame, the response to TF 312 may be beamforming reports that may be transmitted in MU fashion or sequentially.

The method 300 optionally continues at operation 358 with the AP 302 waiting a duration before transmitting. The duration may be a SIFS or another duration.

The method 300 optionally continues at operation 360 with the AP 302 transmitting MU-BA 314. The MU-BA 314 may be received by STA2 304.2 and STA4 304.4. Operations 358 and 360 may be optional because the AP 302 may not need to acknowledge the response to TF 312, e.g. if the response to TF 312 is MU-BA. In some embodiments, the duration of MAC duration 336 may be short to include only the response to TF 312. At time 334, the AP 302 may continue the TXOP by transmitting after operation 360 (e.g., up until TXOP limit 332 to time 335).

Figure 4:
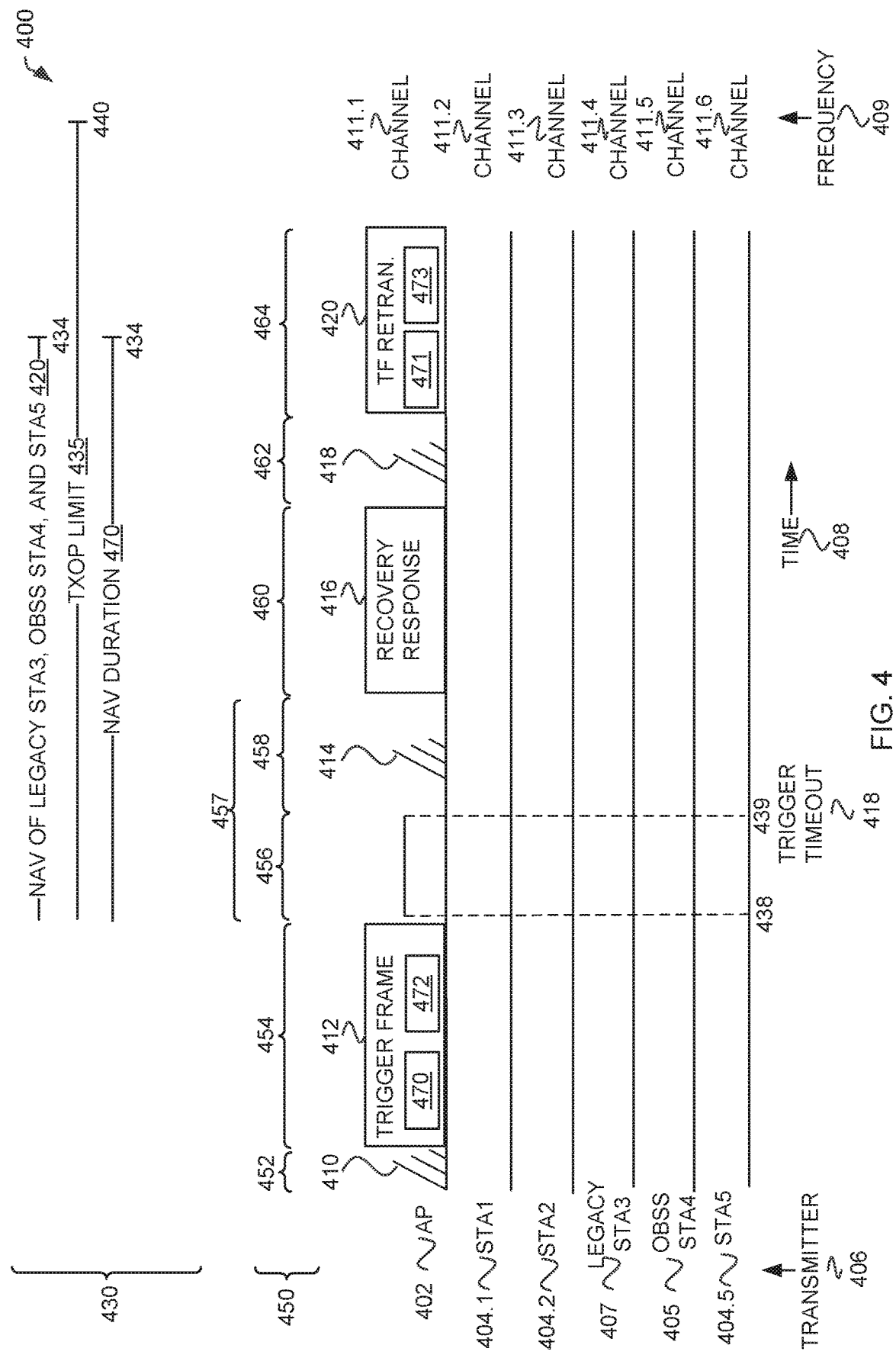
FIG. 4 illustrates a method for recovery methods for a trigger frame in accordance with some embodiments.

FIG. 4 illustrates a method 400 for recovery methods for a trigger frame 412 in accordance with some embodiments. Illustrated in FIG. 4 is time 408 along a horizontal axis, transmitter 406 along a vertical axis, operations 450 along the top, durations 330 along the top, and frequency 409 along a vertical.

The AP 402 may be a master station 102. In some embodiments the AP 402 is a HE station 104. STAs 404 are stations in a same BSS and may be associated with the AP 402. OBSS STA4 405 may be a station that is associated with a different BSS and not associated with the AP 402. The channels 411 may be channels as described herein. The channels 411 may overlap in some embodiments. Legacy STA3 407 may be a legacy station 106 that may be associated with the AP 402 or may be an OBSS legacy station 106 in some embodiments. STA4 405 may a HE station 104 that is associated with a different AP 402 that overlaps with the BSS of the AP 402. STA5 404.5 may be a HE station 104 that is part of the same BSS as the AP 402, but is not indicated in the trigger frame 412.

The method 400 begins at operation 452 with the AP 402 contending 410 for the wireless medium. For example, the AP 402 may contend 410 for the channel 411.1 by waiting a period of time in accordance with a backoff procedure to acquire the channel and then wait until the medium is idle for a distributed interframe space (DIFS) duration until attempting to transmit on the channel 411.

The method 400 may continue at operation 454 with the AP 402 transmitting a trigger frame 412 to STA1 1 404.1 and STA2 404.2. The trigger frame 412 comprises a NAV duration 470 and a schedule 472. The NAV duration 470 indicates how long the AP 402 is attempting to use the wireless medium. If the trigger frame 410 is success and the AP 402 is granted a TXOP, then the AP 402 must operate with a TXOP limit 435. For example, a STA 404 may determine a duration based on a modulation and coding scheme (MCS) and the NAV duration 470. In some embodiments, the NAV duration 470 is termed a NAV length where the duration may be determined based on air parameters such as the MCS.

In some embodiments, the trigger frame 412 is received by the legacy STA3 407 and the OBSS STA4 407, but not by STA1 404.1 and STA2 404.2. Legacy STA3 407 may defer based on a legacy length 210 in a legacy preamble portion of the trigger frame 412. The duration that legacy STA3 407 defers for may be the same or longer than duration of NAV duration 470. The OBSS STA4 405 may defer based on the legacy length 210, or if OBSS STA4 405 is a HE station 104, the HE preamble length 212 or the NAV duration 214.

Both legacy STA3 407 and OBSS STA4 405 may have received the trigger frame 412 and set their NAVs, e.g., NAV of legacy STA3, OBSS STA4, and STA5 420 may be set to time 434 which is the ending of the NAV duration 470 set by the trigger frame 412.

In some embodiments, OBSS STA4 405 may determine based on the BSS color 213 (FIG. 2) of the trigger frame 412 that OBSS STA4 405 should decode the MAC portion of the trigger frame 412. The BSS color 213 may indicate that the BSS color is not the BSS color of the BSS of the OBSS and that OBSS STA4 405 should decode the MAC portion of the trigger frame 412. The trigger frame 412 may be a MU-RTS that is carried in the HE format.

The method 400 continues at operation 456 with the AP 402 waiting for a response to the trigger frame 412 from time 438 to time 439. The AP 402 determines a timeout at time 439. The AP 402 may wait a trigger frame timeout duration before determining that a timeout has occurred. The AP 402 may receive other packets during this time that are not responses to the trigger frame 412, and the AP 402 will still timeout 418 at time 439, which may be the trigger timeout. The trigger timeout 418 may equal (=) (short interframe space) SIFS time+slot time+a receive physical start delay (if preamble decoding is needed), where the STAs 404 would have waited SIFS before responding, the slot time is a duration of a slot for the backoff system, and receive physical start delay is the delay that occurs between the time of receiving the physical header of the response and receiving an indication that the physical header is being read. The length of the HE PHY header for HE trigger based PPDUs may be added to the trigger timeout 418 if the AP 402 does not decode the HE PHY header for the response. The trigger timeout 418 may be how long the AP 402 waits for a response to the trigger frame 412 until the AP 402 determines there is not a response to the trigger frame 412.

The time 438 when the trigger timeout 418 begins may be a time when the AP 402 receives an indication that the trigger frame 412 transmission is completed, e.g. PHYTXEND.confirm primitive. In some embodiments, time 438 begins when the trigger frame 412 transmission is completed (e.g, PHYTXEND.confirm primitive is received.) For example, if an indication is not received of the beginning of receiving a response (e.g, PHY-RXSTART.indication primitive, which may be a primitive from the PHY layer that indicates that reception of a frame has begun) before the trigger timeout 418 duration, then the AP 402 concludes that the transmission of the trigger frame 412 has failed (e.g., STA1 404.1 and STA2 404.2 did not receive the trigger frame 412 or the AP 402 failed to receive a response from STA1 404.1 and STA2 404.2). The trigger timeout 418 duration begins after PHYTXEND.confirm primitive (e.g., a PHY layer primitive that indicates that the transmission of a frame has ended) is received, in accordance with some embodiments.

In some embodiments, if there is an indication of the start of receiving a frame (e.g., PHY-RXSTART.indication primitive) that occurs during the trigger timeout 418 duration or interval, which starts from the time an indication is received that the AP 402 has transmitted the trigger frame 412 (e.g., PHY-TXEND.confirm primitive), but the AP 402 fails to decode any valid frame for the response when an indication is given at the end of receiving a frame (e.g., PHY-RXEND.indication primitive, which may extend past the trigger timeout 418 duration or interval as long as the start of the receiving of the frame occurs before the trigger timeout 418 duration), then the AP 402 assumes the transmission of the trigger frame 412 has failed. The trigger timeout 418 may vary based on the type of trigger frame 412. For example, a MU-RTS trigger frame 412 may have a specific timeout value.

In some embodiments, if the trigger frame 412 is an MU-RTS, if an indication that a frame is being received (e.g., PHY-RXSTART.indication primitive) does occur during the trigger timeout 418 duration (e.g., CTSTimeout interval), the AP 402 waits for the corresponding indication that the frame has been received (e.g., PHY-RXEND.indication primitive) to determine whether the RTS (or MU-RTS) frame transmission was successful. If the received frame is a valid CTS frame (e.g., from STA1 404.1 or STA2 404.2) sent by the recipient of the RTS (or MU-RTS) frame, then the received frame is interpreted as successful response (see FIG. 3 response to TF 312), permitting the frame exchange sequence to continue. The recognition of anything else, including any other valid frame, is interpreted by the AP 402 that the trigger frame 412 has failed (e.g., the RTS frame transmission). The AP 402 then contends for the wireless medium 414 (e.g., the AP 402 invokes its backoff procedure after time 439 trigger timeout 418 (e.g., PHY-RXEND.indication primitive).

The method 400 continues at operation 458 with the AP 402 contending for the wireless medium 414. The AP 402 may have determined the transmission of the trigger frame 412 failed and determines to invoke a recovery procedure. The AP 402 may have determined that the trigger frame 412 was a first trigger frame 412 to initiate a TXOP with TXOP limit 435 and not a trigger frame that was transmitted after a TXOP had been granted to the AP 402 that would be within a TXOP limit 435. The AP 402 initiates a backoff procedure to gain access to the wireless medium. In some embodiments where the trigger frame 412 initiates a TXOP, the AP 402 waits a PIFS duration before transmitting the CF-end. In some embodiments, the AP 402 may contend for the wireless medium by performing a backoff method in accordance with an Enhanced Distributed Channel Access Function (EDCAF).

The method 400 continues at operation 460 with the AP 402 transmitting a recovery response 416. The TXOP limit 435 is no longer applicable because the AP 402 failed to be granted a TXOP. In some embodiments, the recovery response 416 may be a contention free (CF)-end. In some embodiments, the AP 402 will only transmit the CF-end if the transmission is within the NAV duration 470. In some embodiments, the AP 402 is required to send a CF-end. In some embodiments, a predetermined additional duration must be present between the end of the TXOP 435 and the end of the transmission of the CF-End for the AP 402 to transmit the CF-end.

In some embodiments, the method 400 continues at operation 457 with STA5 104.5 and/or OBSS STA4 405 determining to reset its NAV. STA5 104.5 and/or OBSS STA4 405 may have set its NAV based on the trigger frame 412 and then determine to reset its NAV depending on the type of trigger frame 412. For a MU-RTS trigger frame 412, the duration to wait before resetting the NAV may be (2*a SIFS Time)+(CTS_Time, which may be determined based on the PHY format of the MU-RTS frame)+aRxPHYStartDelay (delay to start receiving that a frame is being received)+(2*aSlotTime, where the slot time is the duration of contention window (CW) slot). In some embodiments, the STA5 104.5 (a station attached to the AP 402, but not referenced in the trigger frame 412) and/or OBSS STA4 405 may determine a different time to reset the NAV with a trigger frame 412 type of MU-RTS. The time out for STA5 104.5 and/or OBSS STA4 405 may begin when a MAC of STA5 104.5 and/or OBSS STA4 405 receives an indication of the end of the reception of the trigger frame 412 (e.g., PHY-RXEND.indication primitive.)

In some embodiments, a HEW station 104 that used information from an MU-RTS frame (e.g, trigger frame 412) as the most recent basis to update its NAV setting may reset its NAV if no start of packet receive (e.g., PHY-RXSTART.indication primitive) is received from the PHY layer during a period with a duration of that indicates that stations indicated in the MU-RTS frame are not going to respond (e.g, 2×aSIFSTime)+(CTS_Time)+aRxPHYStartDelay+(2×aSlotTime). The duration may be determined after the HEW station 104 has stopped receive the MU-RTS frame, (e.g., starting when the MAC receives a PHY-RXEND.indication primitive corresponding to the detection of the MU-RTS frame.) In some embodiments, the CTS_Time shall be calculated using the length of the CTS frame and the data rate at which the MU-RTS frame used for the most recent NAV update was received.

In some embodiments, OBSS STA4 405 may have decoded the trigger frame 412 MAC portion based on a BSS color 213 that indicates that the BSS color is not OBSS, but that the OBSS STA4 405 should decode the MAC portion of the trigger frame 412. The OBSS STA4 405 may determine that the trigger frame 412 is a MU-RTS frame based on decoding the MAC portion of the trigger frame 412. If most recent NAV setting of the OBSS STA4 405 was based on the trigger frame 412, the OBSS STA4 405 may be configured to reset its NAV if no frame is received in response to the MU-RTS, e.g., if no indication of the start of reception of a frame (e.g., PHY-RXSTART.indication primitive is received from the PHY) during a period with a duration of (2×aSIFSTime)+(CTS_Time)+aRxPHYStartDelay+(2×aSlotTime) starting when the MAC receives a PHY-RXEND.indication primitive corresponding to the detection of the end of the reception of the MU-RTS frame. In some embodiments where the trigger frame 1 512 initiates the TXOP 535, the AP 402 waits a PIFS duration before transmitting the CF-end.

The method 400 continues at operation 460 with the AP 402 transmitting the recovery response 416. The recovery response 416 may be a CF-end. STA1 404.1, STA2 404.2, legacy STA3 407, OBSS STA4 405, and STA5 404.5 may receive the recovery response 416 and reset their NAVs.

In some embodiments, the recovery response 416 may be a retransmission of the trigger frame 412. The AP 402 may modify the trigger frame 412 to encode the retransmission of the trigger frame 412, e.g., the AP 402 may change durations or lengths to account for the different time the retransmission of the trigger frame is being transmitted or the AP 402 may modify the schedule 472, which may change the NAV duration 470.

The method 400 continues at operation 462 with the AP 402 contending for the wireless medium. For example, the AP 402 may contend 418 for the channel 411.1 by waiting a period of time in accordance with a backoff procedure to acquire the channel and then wait until the medium is idle for a DIFS duration until attempting to transmit on the channel 411. In some embodiments, the AP 402 may contend for the wireless medium by performing a backoff method in accordance with an EDCAF.

The method 400 may continue at operation 464 with the AP 402 transmitting a trigger frame retransmission 420 to STA1 1 404.1 and STA2 404.2. The trigger frame retransmission 420 comprises a NAV duration 471 and a schedule 473. The NAV duration 471 indicates how long the AP 402 is attempting to use the wireless medium. If the trigger frame retransmission 420 is success and the AP 402 is granted a TXOP, then the AP 402 must operate with a TXOP limit (not illustrated). The TXOP limit 435 was for the trigger frame 412 which unsuccessfully tried to initiate a TXOP. NAV duration 471 may be a different value than NAV duration 471, e.g. the AP 402 may adjust the time for UL data. The schedule 473 may be different than schedule 472 because the AP 402 may adjust times and/or STAs 404 based on new information or the new situation of retransmitting. A STA 404 may determine a duration based on a MCS and the NAV duration 471. In some embodiments, the NAV duration 471 is termed a NAV length where the duration may be determined based on air parameters such as the MCS.

In some embodiments, the trigger frame retransmission 420 is received by the legacy STA3 407 and the OBSS STA4 407, and by at least one of STA1 404.1 and STA2 404.2. Legacy STA3 407 may defer based on a legacy length 210 in a legacy preamble portion of the trigger frame retransmission 420. The duration that legacy STA3 407 defers for may be the same or longer than duration of NAV duration 471. The OBSS STA4 405 may defer based on the legacy length 210, or if OBSS STA4 405 is a HE station 104, the HE preamble length 212 or the NAV duration 471.

Both legacy STA3 407 and OBSS STA4 405 may have received the trigger frame retransmission 420 and set their NAVs, e.g., NAV of legacy STA3, OBSS STA4, and STA5 420 may be set to a duration of the NAV duration 471.

In some embodiments, OBSS STA4 405 may determine based on the BSS color 213 (FIG. 2) of the trigger frame retransmission 420 that OBSS STA4 405 should decode the MAC portion of the trigger frame transmission 420. The BSS color 213 value may indicate that the BSS color is not the BSS color of the BSS of the OBSS, and that OBSS STA4 405 should decode the MAC portion of the trigger frame retransmission 420. The trigger frame retransmission 420 may be a MU-RTS that is carried in the HE format.

The method may continue with one or more of STA1 404.1, STA2 404.2, and/or STA5 404, which may receive a resource allocation in the schedule 473, responding to the TF retransmission 420. When the AP 402 receives a response to the TF retransmission 420 then the AP 402 is granted a TXOP that extends from the end of the TF retransmission 420 to a TXOP limit (not illustrated for the TF retransmission).

In some embodiments, if the TF retransmission 420 does not receive a response then the AP 402 attempt again to retransmit the trigger frame 412. In some embodiments, there may be limit of retransmission attempts before the AP 402 stop attempting to retransmit the trigger frame 412 for a period of time. In some embodiments, operations 458 and 460 are not performed.

Figure 5:
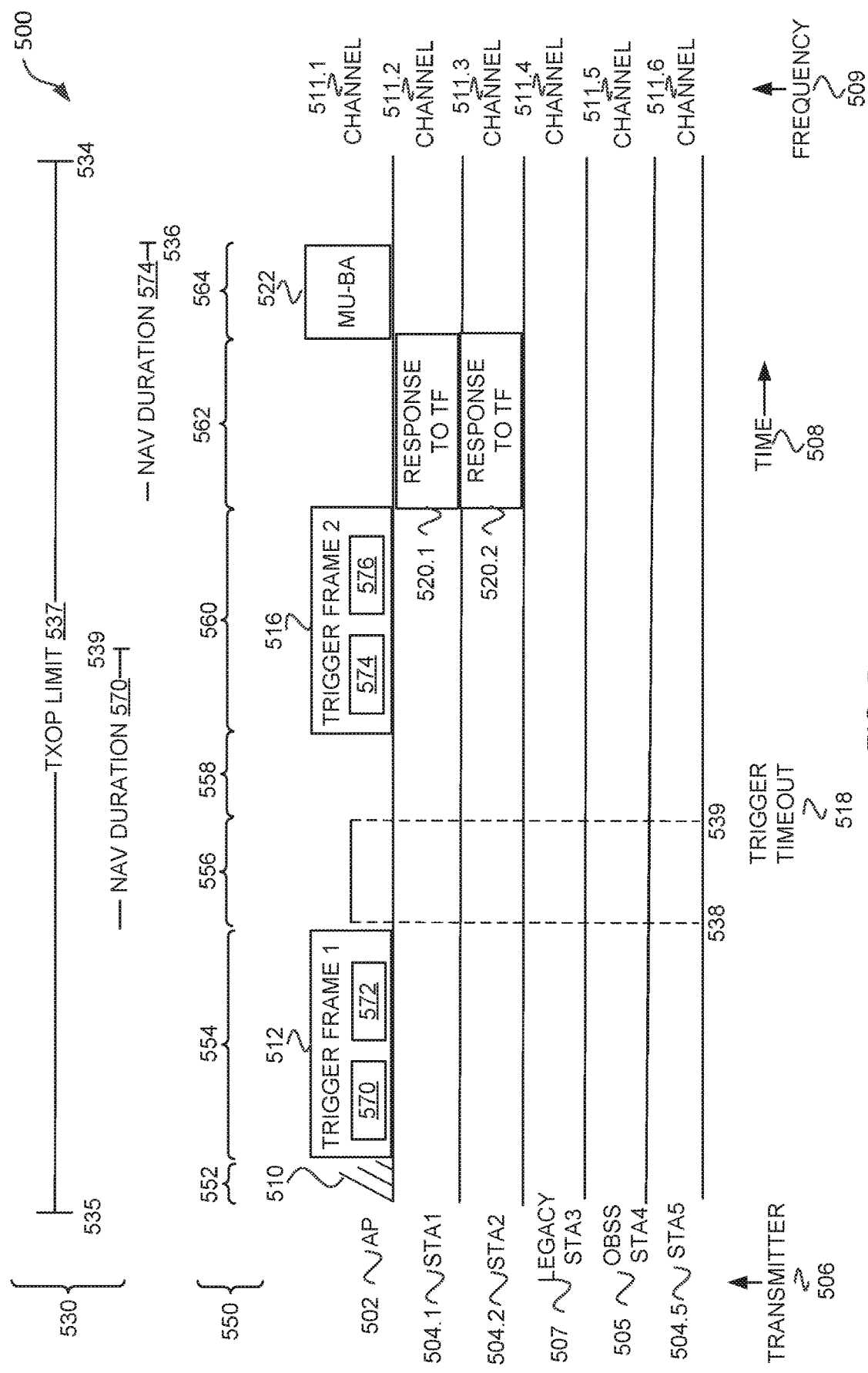
FIG. 5 illustrates a method for recovery methods for a trigger frame in accordance with some embodiments.

FIG. 5 illustrates recovery methods 500 for a trigger frame 512 in accordance with some embodiments. Illustrated in FIG. 5 is time 508 along a horizontal axis, transmitter 506 along a vertical axis, operations 550 along the top, durations 530 along the top, and frequency 509 along a vertical.

The AP 502 may be a master station 102. In some embodiments the AP 502 is a HE station 104. STAs 504 are stations in a same BSS and may be associated with the AP 502. The channels 511 may be channels as described herein. The channels 511 may overlap in some embodiments. Legacy STA3 507 may be a legacy station 106 that may be associated with the AP 402 or may be an OBSS legacy station 106 in some embodiments. STA4 505 may a HE station 104 that is associated with a different AP 502 that overlaps with the BSS of the AP 502. STA5 504.5 may be a HE station 104 that is part of the same BSS as the AP 502, but is not indicated in the trigger frame 512.

Prior to the method 500, the AP 502 has already transmitted a trigger frame that received a valid response. The AP 502 may have been granted a TXOP with a TXOP limit 537 that extends from time 535 before the method 500 begins to time 534. In some embodiments a frame different than a trigger frame initiated the TXOP with a TXOP limit 537.

The method 500 begins at operation 552 with the AP 502 contending 510 for the wireless medium. For example, the AP 502 may contend 510 for the channel 511.1 by waiting a period of time in accordance with a backoff procedure to acquire the channel and then wait until the medium is idle for a DIFS duration until attempting to transmit on the channel 511. In some embodiments, since the AP 502 has already been granted a TXOP, the AP 502 may not contend for the wireless medium or may contend in a different manner. For example, the AP 502 may wait a SIFS after receiving a valid response to a previous trigger frame or the AP 502 may wait PIFS time.

The method 500 may continue at operation 554 with the AP 502 transmitting a trigger frame 1 512 to STA1 1 504.1 and STA2 504.2. The trigger frame 512 comprises a NAV duration 570 and a schedule 572. The NAV duration 570 indicates how long the AP 502 is reserving the wireless medium. The time 539 should be less than or equal to time 534.

In some embodiments, the trigger frame 512 is received by the legacy STA3 507 and the OBSS STA4 507, but not by STA1 504.1 and STA2 504.2. Legacy STA3 507, OBSS STA4 505, and STA5 504.5 may have already set their NAV to time 539 (e.g., the end of the NAV duration 570). In some embodiments, trigger frame 1 512 is not received by STA1 504.1 and STA2 504.2.

The method 500 continues at operation 556 with the AP 502 waiting for a response to the trigger frame 512 from time 538 to time 539. The AP 502 determines a timeout at time 539. The AP 502 may determine the trigger timeout 518 in a same or similar manner as described in conjunction with FIG. 4. The AP 502 may have determined the transmission of the trigger frame 512 failed and determines to attempt to resend the trigger frame 1 512.

The method 500 continues at operation 558 with the AP 502 waiting a period of time. In some embodiments, the AP 502 based on a PIFS recovery method. The channel access function of the AP 502 may transmit after the carrier sense (CS) mechanism indicates that the medium (e.g., channel 511.1) is idle at the transmission PIFS slot boundary as defined by the distributed coordination function (DCF) timing relations.

Before performing operation 558, the AP 502 may determine whether the duration of operations 558, 560, 562, and 564 are within the TXOP limit 537. If the operations 558, 560, 562, and 564 are within the TXOP limit 537, then the method 500 continues with operation 558. Otherwise the method 500 may continue with operation 558, and then a CF-end may be transmitted, in accordance with some embodiments. In some embodiments, prior to transmitting the CF-end the AP 502 will contend for the wireless medium.

The method 500 continues at operation 560 with the AP 402 transmitting a trigger frame 2 516 comprising a length 574 and a schedule 576. The length 574 may have a duration of length 574 that extends to time 536. The schedule 576 may include a resource allocation for STA1 504.1 and STA2 504.2. STA1 504.1 and STA2 504.2 may successively receive trigger frame 2 516. Legacy STA3 507 may receive the trigger frame 2 and determine whether to set its NAV based on the length 574 (which may be in a legacy portion of the trigger frame 516 for the legacy STA3 507). The OBSS STA4 505 and/or STA5 504.5 may receive trigger frame 2 516 and determine not to reset its NAV based on a timeout from the trigger frame 1 512 based on receiving the trigger frame 2 516. In some embodiments, OBSS STA5 505 and/or STA5 504.5 time out and reset their NAVs and then set their NAV again based on the NAV duration 574.

The method 500 continues at operation 562 with STA1 504.1 and STA2 504.2 transmitting response to TF 520.1 and response to TF 520.2, respectively, which may be data, and may be in accordance with the schedule 576.

The method 500 continues at operation 564 with the AP 502 transmitting a MU-BA 522 to STA1 504.1 and STA2 504.2.

Figure 6:
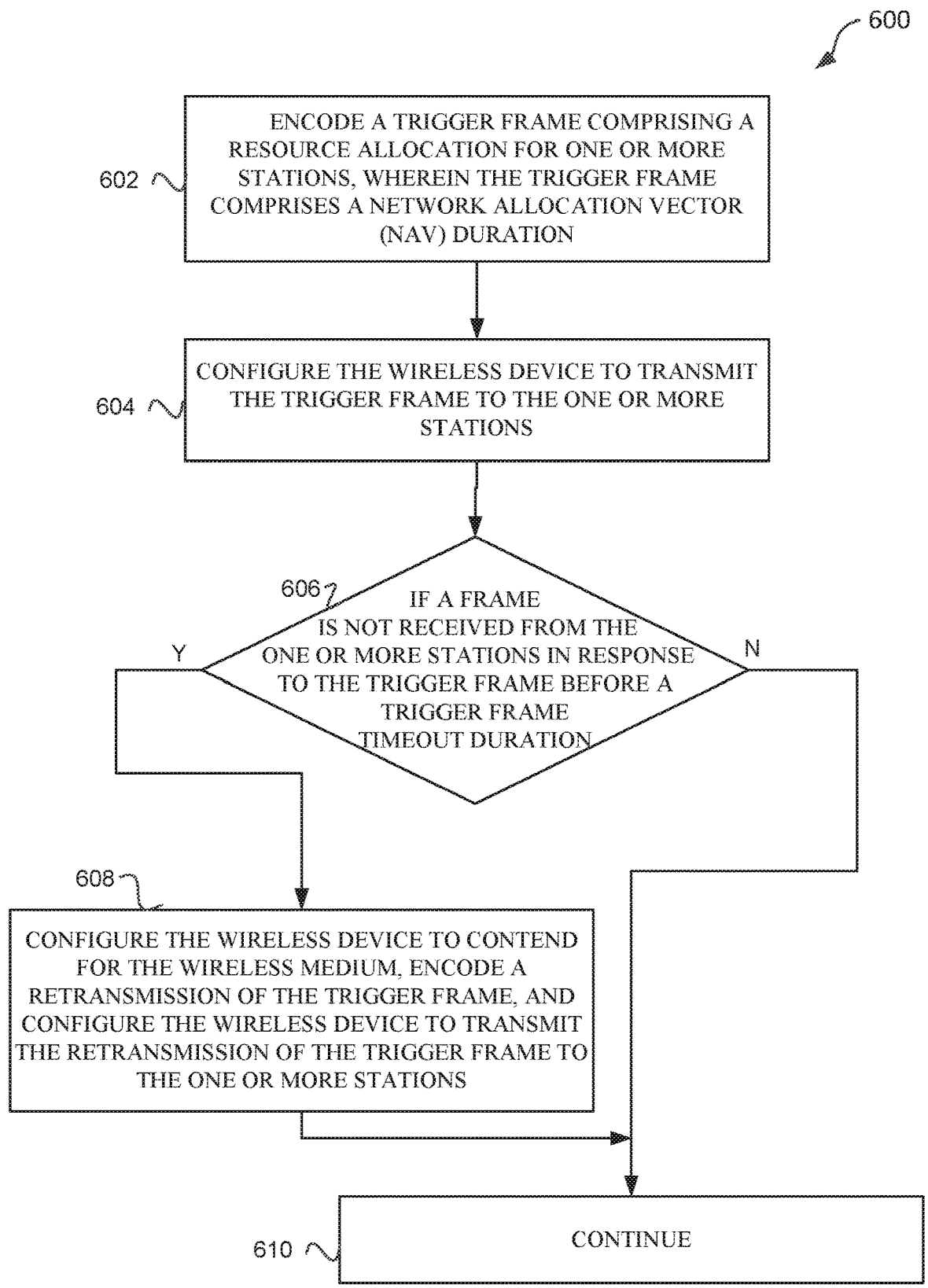
FIG. 6 illustrates a recovery method for trigger frame in accordance with some embodiments.

FIG. 6 illustrates a recovery method 600 for trigger frame in accordance with some embodiments. The method 600 begins at operation 602 with encode a trigger frame comprising a resource allocation for one or more stations, wherein the trigger frame comprises a NAV duration. For example, AP 402 (FIG. 4) encodes trigger frame 412 with schedule 472 and NAV duration 470. In another example, AP 502 encode trigger frame 1 512 with schedule 572 and NAV duration 570.

The method 600 continues at operation 604 with configuring the wireless device to transmit the trigger frame to the one or more stations. For example, an apparatus of the AP 402 may configure the AP 402 to transmit the trigger frame 412. In another example, an apparatus of the AP 502 may configure the AP 502 to transmit the trigger frame 512.

The method 600 continues at operation 606 determine whether a frame is not received from the one or more stations in response to the trigger frame before a trigger frame timeout duration. For example, AP 402 may determine that a trigger timeout 418 has occurred. In another example, AP 502 may determine that a trigger timeout 518 has occurred.

If a trigger timeout has not occurred, then the method 500 may continue at operation 610 with continue. For example, after operation 464 the AP 402 may receive responses from STAs 404. In another example, AP 502 receives response to TF 520.

If the trigger timeout has occurred, then the method 600 continues at operation 608 with configure the wireless device to contend for the wireless medium, encode a retransmission of the trigger frame, and configure the wireless device to transmit the retransmission of the trigger frame to the one or more stations. For example, AP 402 may contend for the wireless medium at operation 418 and an apparatus of the AP 402 may configure the AP 402 to transmit the TF retransmission 420. In another example, AP 502 may contend for the wireless medium at operation 558, and an apparatus of the AP 502 may configure the AP 502 to transmit the trigger frame 2 516. In the example of FIG. 5, if the AP 502 determines that the NAV duration 574 would extend past TXOP limit 537, then the AP 502 may wait until after the TXOP to contend for the wireless medium, encode a retransmission of the trigger frame, and configure the wireless device to transmit the retransmission of the trigger frame to the one or more stations. Additionally, the AP 502 may determine to transmit a CF-end, e.g., at operations 558 and 560 if the NAV duration 574 would extend past the TXOP limit 527. The AP 502 may contend for the wireless medium before transmitting the CF-end.

In the example of FIG. 4, the AP 402 may transmit a CF-end (e.g., operation 460) before transmitting the TF retransmission 420, and may contend for the wireless medium before transmitting the CF-end (e.g, operation 458). The method 600 may continue at operation 610 with continue.

Figure 7:
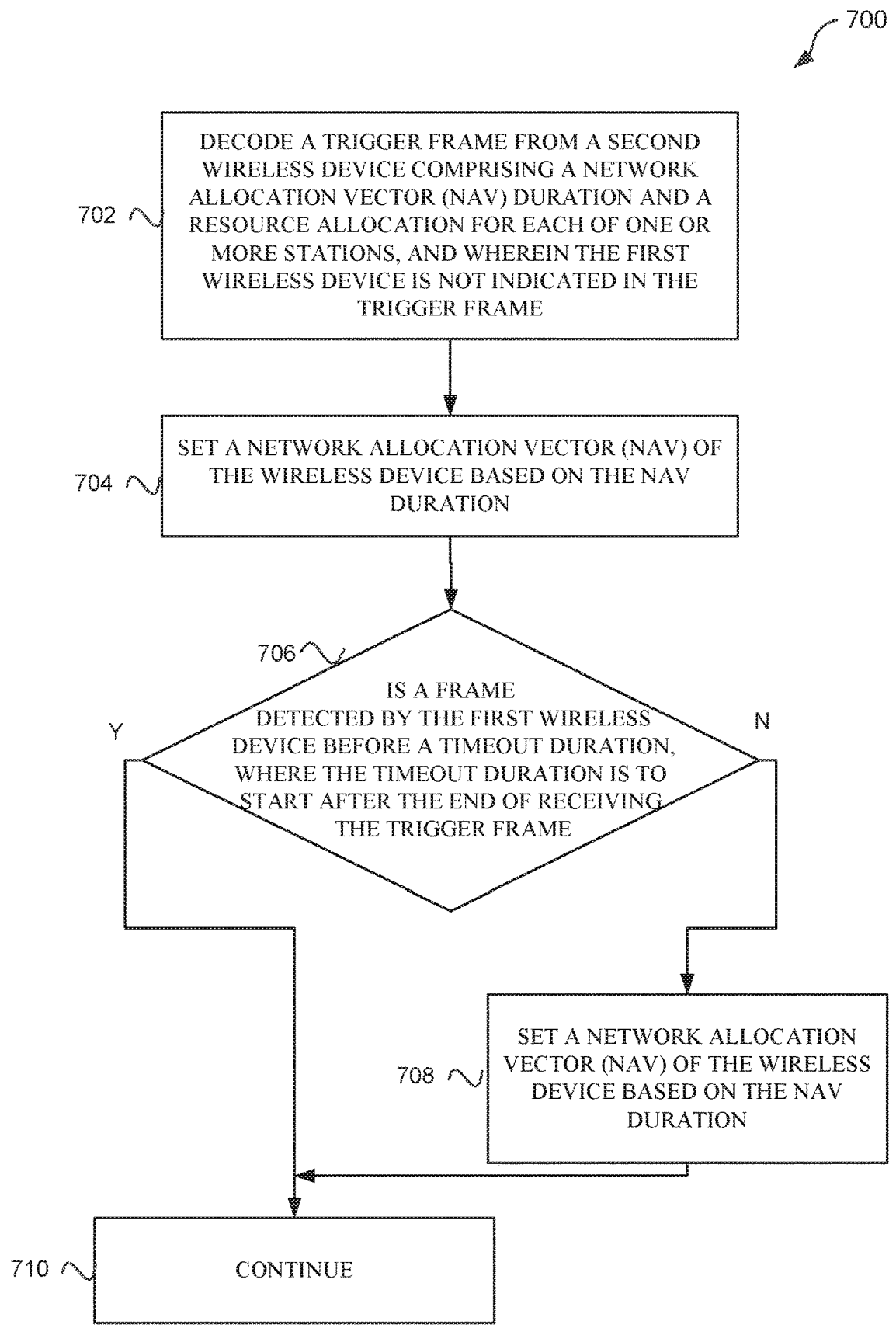
FIG. 7 illustrates a recovery method for trigger frame in accordance with some embodiments.

FIG. 7 illustrates a recovery method 700 for trigger frame in accordance with some embodiments. The method 700 begins at operation 702 with decoding a trigger frame from a second wireless device comprising a NAV duration and a resource allocation for each of one or more stations, and where the first wireless device is not indicated in the trigger frame. For example, OBSS STA4 405 or STA5 404.5 (FIG. 4) may receive trigger frame 412, where OBSS STA4 405 and STA5 404.5 are not indicated in the schedule 472. In some embodiments, the trigger frame may include a color 213 (FIG. 2) that indicates that an OBSS station such as OBSS STA4 405 should decode the MAC portion of the trigger frame (e.g., the color 213 may have a value of 0, 255, or anther value to indicate to the OBSS station to decode the MAC portion and use the NAV duration 214 rather than a another duration or length indicated in the PHY portion of the trigger frame.)

The method 700 continues at operation 704 with setting a NAV of the wireless device based on the NAV duration. For example, OBSS STA4 405 and STA5 404.5 set a NAV (e.g., NAV of legacy STA3, OBSS STA4, and STA5 420) based on the NAV duration 470.

The method 700 continues at operation 706 with is a frame detected by the first wireless device before a timeout duration, where the timeout duration is to start after the end of receiving the trigger frame. For example, OBSS STA4 405 and STA5 404.5 may not detect a frame before a timeout duration. Alternatively, STA3 304.3 may detect response to TF 312.2, 312.4 before a timeout duration after receiving trigger frame 310. In some embodiments, the timeout duration is determined based on whether the trigger frame is a multi-user request-to-send (MU-RTS) or another type of trigger frame.

The method 700 may continue if no frame is detected before the timeout duration with resetting the NAV of the first wireless device. For example, OBSS STA4 405 and STA5 404.5 may reset their respective NAVs after a timeout duration (e.g., timeout duration may be at time 439.) The method 700 continues at operation 710 with continue.

If the first wireless device detects a frame before the timeout duration, then the method 700 continues to operation 710 with continue.

Figure 8:
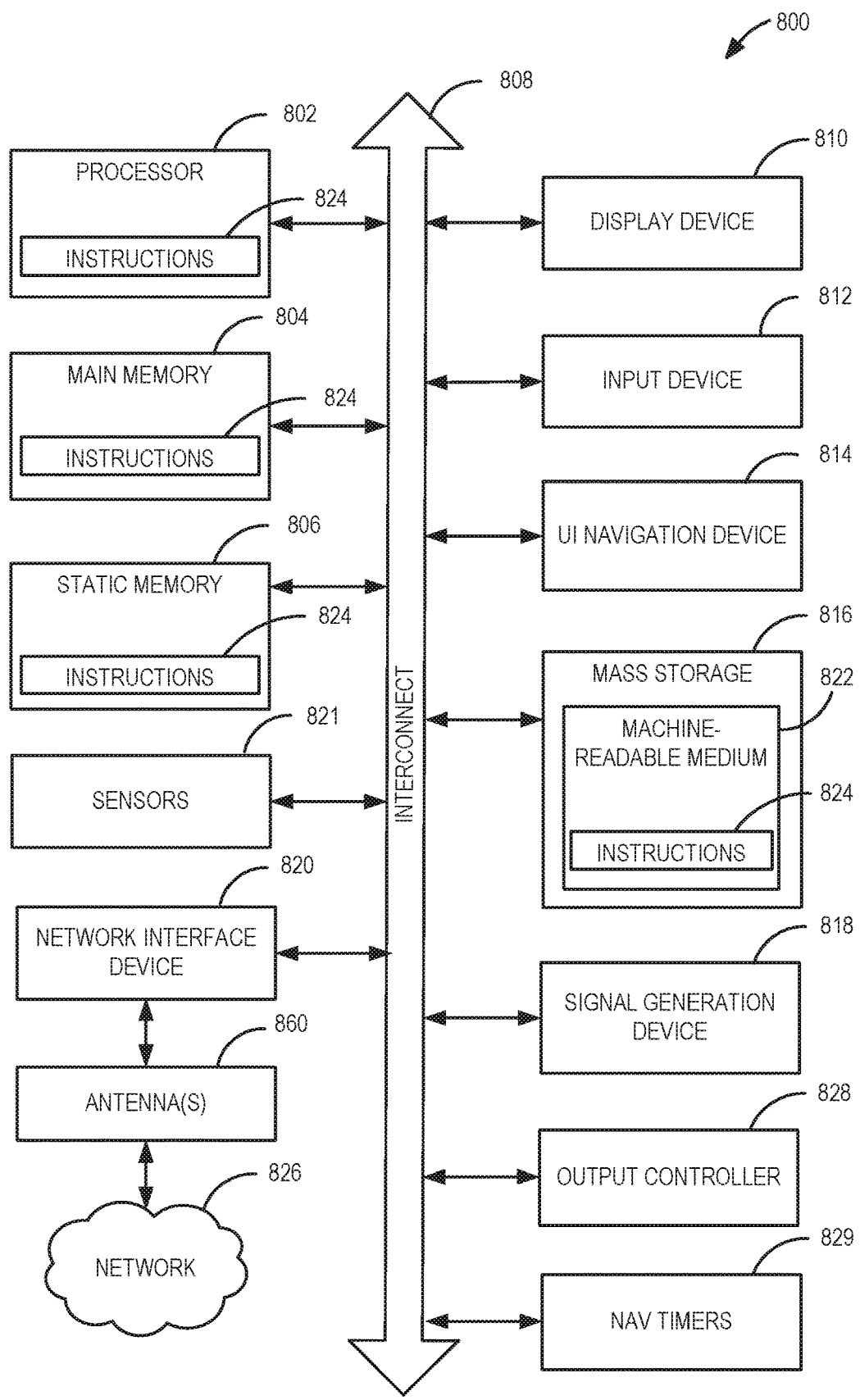
FIG. 8 illustrates a block diagram of an example machine upon which any one or more of the techniques (e.g., methodologies) discussed herein may perform.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display device 810, an input device 812 (e.g., a keyboard), and a user interface (UI) navigation device 814 (e.g., a mouse). In an example, the display device 810, input device 812 and UI navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

An apparatus of the machine 800 may be one or more of a hardware processor 802 (e.g., a central processing unit (CPU), a graphics processing unit (GPU), a hardware processor core, or any combination thereof), a main memory 804, a static memory 806, instructions 824, display device 810, input device 812, UI navigation device 814, mass storage 816, signal generation 818, output controller 828, NAV timers 829, sensors 821, network interface device 820, and antennas 860 some or all of which may communicate with each other via an interlink (e.g., bus) 808. One or more of the following of the apparatus of the machine 800 may be separate from the machine 800 and may be configured to work in conjunction with the machine 800, or be a portion or component of the machine 800: a hardware processor (e.g., a central processing unit (CPU), a graphics processing unit (GPU), a hardware processor core, or any combination thereof), a main memory, a static memory, instructions, display device, input device, UI navigation device, mass storage, signal generation, output controller, NAV timers, sensors, network interface device, and antennas. The apparatus of the machine 800 may be configured to perform one or more of the methods or functions described herein.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 800, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a wireless device including: memory; and processing circuitry coupled to the memory, the processing circuitry configured to: encode a trigger frame including a resource allocation for one or more stations, where the trigger frame comprises a network allocation vector (NAV) duration; configure the wireless device to transmit the trigger frame to the one or more stations; and if a response frame is not received from the one or more stations in response to the trigger frame before a trigger frame timeout duration, configure the wireless device to contend for the wireless medium a first time, encode a retransmission of the trigger frame, and configure the wireless device to transmit the retransmission of the trigger frame to the one or more stations.

In Example 2, the subject matter of Example 1 optionally includes where the processing circuitry is further configured to: configure the wireless device to contend for the wireless medium a second time prior to the contending for the wireless medium the first time; encode a contention-free (CF) end; and configure the wireless device to transmit the CF end.

In Example 3, the subject matter of any one or more of Examples 1-2 optionally include where the processing circuitry is further configured to: encode a contention-free (CF) end prior to contending for the wireless medium the first time; and configure the wireless device to transmit the CF end.

In Example 4, the subject matter of any one or more of Examples 1-3 optionally include where the processing circuitry is further configured to: if the NAV duration is greater than a threshold, contend for the wireless medium a second time prior to contending for the wireless medium the first time; encode a contention-free (CF) end; and configure the wireless device to transmit the CF end.

In Example 5, the subject matter of any one or more of Examples 1-4 optionally include where the processing circuitry is further configured to: if the NAV duration is greater than a threshold, encode a contention-free (CF) end prior to contending for the wireless medium the first time; configure the wireless device to transmit the CF end.

In Example 6, the subject matter of any one or more of Examples 1-5 optionally include where the processing circuitry is further configured to: if the trigger frame is to be transmitted within a transmission opportunity (TXOP), and a remaining duration of a limit of the TXOP is greater than a threshold, contend for the wireless medium, encode a retransmission of the trigger frame, and configure the wireless device to transmit the retransmission of the trigger frame to the one or more stations.

In Example 7, the subject matter of Example 6 optionally includes where the processing circuitry is further configured to: contend for the wireless medium by determining that the wireless medium is idle if at a point coordination function (PCF) interframe space (PIFS) slot boundary the wireless medium is idle.

In Example 8, the subject matter of any one or more of Examples 1-7 optionally include where the processing circuitry is further configured to: if the trigger frame is to be transmitted within a transmission opportunity (TXOP) after a second trigger frame or another type of frame that initiated the TXOP, and a remaining duration of a limit of the TXOP is less than a threshold, contend for the wireless medium, encode a contention-free (CF) end, and configure the wireless device to transmit the CF end.

In Example 9, the subject matter of any one or more of Examples 1-8 optionally include where the processing circuitry is further configured to: if the trigger frame is to be transmitted within a transmission opportunity (TXOP) after a frame that initiated the TXOP, and a remaining duration of a limit of the TXOP is less than a threshold, encode a contention-free (CF) end, and configure the wireless device to transmit the CF end.

In Example 10, the subject matter of any one or more of Examples 1-9 optionally include where the processing circuitry is further configured to: if the trigger frame is to be transmitted within a transmission opportunity (TXOP), and a remaining duration of a limit of the TXOP is less than a threshold, configure the wireless device to refrain from transmitting until the end of the limit of the TXOP.

In Example 11, the subject matter of any one or more of Examples 1-10 optionally include where the trigger frame timeout duration is based on whether the trigger frame is a multi-user request-to-send (MU-RTS) or another type of trigger frame.

In Example 12, the subject matter of any one or more of Examples 1-11 optionally include where the trigger frame is to initiate a transmission opportunity.

In Example 13, the subject matter of any one or more of Examples 1-12 optionally include where the trigger frame is one from the following group: multi-user (MU) block acknowledgement request (BARXMU-BAR) trigger frame, MU request-to-send (RTS) (MU-RTS) trigger frame, beamforming request trigger frame, a beamforming report poll trigger frame, and MU uplink (UL) data trigger frame.

In Example 14, the subject matter of any one or more of Examples 1-13 optionally include where the wireless device and the one or more stations are each one from the following group: an Institute of Electrical and Electronic Engineers (IEEE) 14 is missing parent: 14 is missing parent: 802.11ax access point, an IEEE 802.11ax station, an IEEE 14 is missing parent: 14 is missing parent: 802.11 station, and an IEEE 802.11 access point.

In Example 15, the subject matter of any one or more of Examples 1-14 optionally include transceiver circuitry coupled to the processing circuitry.

Example 16 is a non-transitory computer-readable storage medium that stores instructions for execution by one or more processors, the instructions to configure the one or more processors to cause a wireless device to: encode a trigger frame including a resource allocation for one or more stations, where the trigger frame comprises a network allocation vector (NAV) duration; configure the wireless device to transmit the trigger frame to the one or more stations; and if a frame is not received from the one or more stations in response to the trigger frame before a trigger frame timeout duration, configure the wireless device to contend for the wireless medium a first time, encode a retransmission of the trigger frame, and configure the wireless device to transmit the retransmission of the trigger frame to the one or more stations.

In Example 17, the subject matter of Example 16 optionally includes where the instructions further configure the one or more processors to cause the wireless device to: configure the wireless device to contend for the wireless medium a second time prior to the contending for the wireless medium the first time; encode a contention-free (CF) end; and configure the wireless device to transmit the CF end.

Example 18 is a method performed by a wireless device, the method including: encoding a trigger frame including a resource allocation for one or more stations, where the trigger frame comprises a network allocation vector (NAV) duration; configuring the wireless device to transmit the trigger frame to the one or more stations; and if a frame is not received from the one or more stations in response to the trigger frame before a trigger frame timeout duration, configuring the wireless device to contend for the wireless medium a first time, encoding a retransmission of the trigger frame, and configuring the wireless device to transmit the retransmission of the trigger frame to the one or more stations.

In Example 19, the subject matter of Example 18 optionally includes configure the wireless device to contend for the wireless medium a second time prior to the contending for the wireless medium the first time; encode a contention-free (CF) end; and configure the wireless device to transmit the CF end.

Example 20 is an apparatus of a first wireless device including: memory; and processing circuitry coupled to the memory, the processing circuitry configured to: decode a trigger frame from a second wireless device including a network allocation vector (NAV) duration and a resource allocation for each of one or more stations, and where the first wireless device is not indicated in the trigger frame; set a NAV of the wireless device based on the NAV duration; and if no frame is detected by the first wireless device, in a timeout duration, reset the NAV of the first wireless device, where the timeout duration is to start after the end of receiving the trigger frame.

In Example 21, the subject matter of Example 20 optionally includes where the timeout duration is determined based on whether the trigger frame is a multi-user request-to-send (MU-RTS) or another type of trigger frame.

In Example 22, the subject matter of any one or more of Examples 20-21 optionally include where the first wireless device is associated with a same basic service set (BSS) as the second wireless device or an overlapping BSS (OBSS) of the second wireless device.

In Example 23, the subject matter of any one or more of Examples 20-22 optionally include where the processing circuitry is further configured to: decode a basic service set (BSS) color of the trigger frame, where the trigger frame comprises an high efficiency (HE) signal A field that comprises the BSS color; and if the BSS color indicates a different color than a color of the first wireless device and a value of the BSS color indicates that the first wireless device is to decode a media access control (MAC) portion of the trigger frame, decode the MAC portion of the trigger frame.

Example 24 is an apparatus of a wireless device, the apparatus including: means for encoding a trigger frame including a resource allocation for one or more stations, where the trigger frame comprises a network allocation vector (NAV) duration; means for configuring the wireless device to transmit the trigger frame to the one or more stations; and if a frame is not received from the one or more stations in response to the trigger frame before a trigger frame timeout duration, means for configuring the wireless device to contend for the wireless medium a first time, means for encoding a retransmission of the trigger frame, and configure the wireless device to transmit the retransmission of the trigger frame to the one or more stations.

In Example 25, the subject matter of Example 24 optionally includes means for configuring the wireless device to contend for the wireless medium a second time prior to the contending for the wireless medium the first time; means for encoding a contention-free (CF) end; and means for configuring the wireless device to transmit the CF end.

In Example 26, the subject matter of any one or more of Examples 24-25 optionally include means for encoding a contention-free (CF) end prior to contending for the wireless medium the first time; and means for configuring the wireless device to transmit the CF end.

In Example 27, the subject matter of any one or more of Examples 24-26 optionally include if the NAV duration is greater than a threshold, means for contending for the wireless medium a second time prior to contending for the wireless medium the first time; means for encoding a contention-free (CF) end; and means for configuring the wireless device to transmit the CF end.

In Example 28, the subject matter of any one or more of Examples 24-27 optionally include if the NAV duration is greater than a threshold, then before the contend for the wireless medium, means for encoding a contention-free (CF) end; and means for configuring the wireless device to transmit the CF end.

In Example 29, the subject matter of any one or more of Examples 24-28 optionally include if the trigger frame is to be transmitted within a transmission opportunity (TXOP), and a remaining duration of a limit of the TXOP is greater than a threshold, means for contending for the wireless medium, means for encoding a retransmission of the trigger frame, and means for configuring the wireless device to transmit the retransmission of the trigger frame to the one or more stations.

In Example 30, the subject matter of Example 29 optionally includes means for contending for the wireless medium by determining that the wireless medium is idle if at a point coordination function (PCF) interframe space (PIFS) slot boundary the wireless medium is idle.

In Example 31, the subject matter of any one or more of Examples 24-30 optionally include if the trigger frame is to be transmitted within a transmission opportunity (TXOP) after a second trigger frame or another type of frame that initiated the TXOP, and a remaining duration of a limit of the TXOP is less than a threshold, means for contending for the wireless medium, means for encoding a contention-free (CF) end, and means for configuring the wireless device to transmit the CF end.

In Example 32, the subject matter of any one or more of Examples 24-31 optionally include if the trigger frame is to be transmitted within a transmission opportunity (TXOP) after a frame that initiated the TXOP, and a remaining duration of a limit of the TXOP is less than a threshold, means for encoding a contention-free (CF) end, and means for configuring the wireless device to transmit the CF end.

In Example 33, the subject matter of any one or more of Examples 24-32 optionally include if the trigger frame is to be transmitted within a transmission opportunity (TXOP), and a remaining duration of a limit of the TXOP is less than a threshold, means for configuring the wireless device to refrain from transmitting until the end of the limit of the TXOP.

In Example 34, the subject matter of any one or more of Examples 24-33 optionally include where the trigger frame timeout duration is based on whether the trigger frame is a multi-user request-to-send (MU-RTS) or another type of trigger frame.

In Example 35, the subject matter of any one or more of Examples 24-34 optionally include where the trigger frame is to initiate a transmission opportunity.

Example 36 is a non-transitory computer-readable storage medium that stores instructions for execution by one or more processors, the instructions to configure the one or more processors to cause a wireless device to: decode a trigger frame from a second wireless device including a network allocation vector (NAV) duration and a resource allocation for each of one or more stations, and where the first wireless device is not indicated in the trigger frame; set a NAV of the wireless device based on the NAV duration; and if no frame is detected by the first wireless device, in a timeout duration, reset the NAV of the first wireless device, where the timeout duration is to start after the end of receiving the trigger frame.

In Example 37, the subject matter of Example 36 optionally includes where the timeout duration is determined based on whether the trigger frame is a multi-user request-to-send (MU-RTS) or another type of trigger frame.

In Example 38, the subject matter of any one or more of Examples 36-37 optionally include where the first wireless device is associated with a same basic service set (BSS) as the second wireless device or an overlapping BSS (OBSS) of the second wireless device.

In Example 39, the subject matter of any one or more of Examples 36-38 optionally include where the instructions further configure the one or more processors to cause a wireless device to: decode a basic service set (BSS) color of the trigger frame, where the trigger frame comprises an high efficiency (HE) signal A field that comprises the BSS color; and if the BSS color indicates a different color than the first wireless device and a value of the BSS color indicates that the first wireless device is to decode a media access control (MAC) portion of the trigger frame, decode the MAC portion of the trigger frame.

Example 40 is a method performed by a wireless device, the method including: decoding a trigger frame from a second wireless device including a network allocation vector (NAV) duration and a resource allocation for each of one or more stations, and where the first wireless device is not indicated in the trigger frame; setting a NAV of the wireless device based on the NAV duration; and if no frame is detected by the first wireless device, in a timeout duration, resetting the NAV of the first wireless device, where the timeout duration is to start after the end of receiving the trigger frame.

In Example 41, the subject matter of Example 40 optionally includes where the timeout duration is determined based on whether the trigger frame is a multi-user request-to-send (MU-RTS) or another type of trigger frame.

In Example 42, the subject matter of any one or more of Examples 40-41 optionally include where the first wireless device is associated with a same basic service set (BSS) as the second wireless device or an overlapping BSS (OBSS) of the second wireless device.

In Example 43, the subject matter of any one or more of Examples 40-42 optionally include the method further including: decoding a basic service set (BSS) color of the trigger frame, where the trigger frame comprises an high efficiency (HE) signal A field that comprises the BSS color; and if the BSS color indicates a different color than the first wireless device and a value of the BSS color indicates that the first wireless device is to decode a media access control (MAC) portion of the trigger frame, decoding the MAC portion of the trigger frame.

Example 44 is a apparatus of a wireless device, the apparatus including: means for decoding a trigger frame from a second wireless device including a network allocation vector (NAV) duration and a resource allocation for each of one or more stations, and where the first wireless device is not indicated in the trigger frame; means for setting a NAV of the wireless device based on the NAV duration; and if no frame is detected by the first wireless device, in a timeout duration, means for resetting the NAV of the first wireless device, where the timeout duration is to start after the end of receiving the trigger frame.

In Example 45, the subject matter of Example 44 optionally includes where the timeout duration is determined based on whether the trigger frame is a multi-user request-to-send (MU-RTS) or another type of trigger frame.

In Example 46, the subject matter of any one or more of Examples 44-45 optionally include where the first wireless device is associated with a same basic service set (BSS) as the second wireless device or an overlapping BSS (OBSS) of the second wireless device.

In Example 47, the subject matter of any one or more of Examples 44-46 optionally include the apparatus further including: means for decoding a basic service set (BSS) color of the trigger frame, where the trigger frame comprises an high efficiency (HE) signal A field that comprises the BSS color; and means for if the BSS color indicates a different color than the first wireless device and a value of the BSS color indicates that the first wireless device is to decode a media access control (MAC) portion of the trigger frame, decoding the MAC portion of the trigger frame.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the apparatus comprising: memory; and, processing circuitry coupled to the memory, the processing circuitry configured to:
encode a trigger frame, the trigger frame comprising a type field indicating the trigger frame is a multi-user request-to-send (MU-RTS) trigger frame, the trigger frame further comprising indications of HE stations to solicit clear-to-send (CTS) frames to be transmitted by the HE stations in response to the MU-RTS trigger frame, and the trigger frame further comprising a network allocation vector (NAV) duration, the NAV duration indicating a transmission opportunity (TXOP) duration of a TXOP;
configure the HE AP to transmit the MU-RTS trigger frame, the MU-RTS trigger frame to initiate the TXOP;
if a physical (PHY) receive (RX) start (PHY-RXSTART) .indication primitive is not received before a timeout duration of a short interframe space time (SIFSTime)+a slot time (aSlotTime)+aRxPHYStartDelay after transmission of the MU-RTS trigger frame, determine that the transmission of the MU-RTS trigger frame has failed; and
if the transmission of the MU-RTS trigger frame has failed, and if the TXOP was initiated, configure the HE AP to invoke a backoff procedure at an PHY-RXEND- .indication primitive.

2. The apparatus of claim 1, wherein the processing circuitry is further configured to:
if a PHY-RXSTART.indication primitive is received before the timeout duration, wait for a corresponding PHY-RXEND.indication primitive, and if a clear-to-send (CTS) frame is received from one of the HE stations before the corresponding PHY-RXEND.indication primitive, determine the transmission of the MU-RTS trigger frame was successful; and if another frame is received before the corresponding PHY-RX-END.indication primitive, determine that the transmission of the MU-RTS trigger frame has failed.

3. The apparatus of claim 1, wherein the timeout duration begins after a PHY-TXEND.confirm primitive is received for transmitting the MU-RTS trigger frame.

4. The apparatus of claim 1, wherein the TXOP duration is set to a duration extending to an end of a transmission of a multi-station block acknowledgement.

5. The apparatus of claim 1, wherein aRxPHYStartDelay indicates a delay duration for the HE AP to receive the PHY-RXSTART.indication primitive.

6. The apparatus of claim 1, wherein the processing circuitry is further configured to:
encode another trigger frame, the another trigger frame comprising another type field indicating the another trigger frame is another MU-RTS trigger frame, and the trigger frame further comprising indications of the HE stations to solicit CTS frames to be transmitted by the HE stations in response to the another MU-RTS trigger frame.

7. The apparatus of claim 6, wherein the processing circuitry is further configured to:
after the backoff procedure has gained access to a channel, configure the HE AP to transmit the another MU-RTS trigger frame.

8. The apparatus of claim 1, wherein the processing circuitry is further configured to:
if a remaining TXOP duration is below a threshold, encode a contention-free (CF) end, and
after the backoff procedure has gained access to a channel, configure the HE AP to transmit the CF end.

9. The apparatus of claim 1, wherein the processing circuitry is further configured to:
encode a contention-free (CF) end; and
after the backoff procedure has gained access to a channel, configure the HE AP to transmit the CF end.

10. The apparatus of claim 1, wherein the processing circuitry is further configured to:
if a remaining TXOP duration is above a threshold, encode another trigger frame, the another trigger frame comprising another type field indicating the another trigger frame is another MU-RTS trigger frame, and the trigger frame further comprising indications of the HE stations to solicit CTS frames to be transmitted by the HE stations in response to the another MU-RTS trigger frame, and after the backoff procedure has gained access to a channel, configure the HE AP to transmit the another MU-RTS trigger frame.

11. The apparatus of claim 1, wherein the processing circuitry is further configured to:
invoke the backoff procedure by determining whether a channel is idle for a point coordination function (PCF) interframe space (PIFS) slot duration;
in response to a determination that the channel is idle for the PIFS slot duration, determine that the channel is idle; and
in response to a determination that the channel is not idle during the PIFS slot duration, increase the PIFS slot duration by a multiple of the PIFS slot duration, and determine whether the channel is idle for the multiple of the PIFS slot duration.

12. The apparatus of claim 1, wherein the backoff procedure is performed in accordance with Enhanced Distributed Channel Access Function (EDCAF).

13. The apparatus of claim 1 wherein the HE AP is configured to operate in accordance with at least one from the following group: Institute of Electrical and Electronic Engineers (IEEE) 802.11ax and IEEE 802.11.

14. The apparatus of claim 1, further comprising a transceiver coupled to the processing circuitry; and further comprising one or more antennas coupled to the transceiver.

15. A non-transitory computer-readable storage medium that stores instructions for execution by one or more processors of an apparatus of a high-efficiency (HE) access point (AP), the instructions to configure the one or more processors to:
encode a trigger frame, the trigger frame comprising a type field indicating the trigger frame is a multi-user request-to-send (MU-RTS) trigger frame, the trigger frame further comprising indications of HE stations to solicit clear-to-send (CTS) frames to be transmitted by the HE stations in response to the MU-RTS trigger frame, and the trigger frame further comprising a network allocation vector (NAV) duration, the NAV duration indicating a transmission opportunity (TXOP) duration of a TXOP;

configure the HE AP to transmit the MU-RTS trigger frame, the MU-RTS trigger frame to initiate the TXOP;

if a physical (PHY) receive (RX) start (PHY-RXSTART) .indication primitive is not received before a timeout duration of a short interframe space time (SIFSTime)+a slot time (aSlotTime)+aRxPHYStartDelay after transmission of the MU-RTS trigger frame, determine that the transmission of the MU-RTS trigger frame has failed; and if the transmission of the MU-RTS trigger frame has failed, and if the TXOP was initiated, configure the HE AP to invoke a backoff procedure at an PHY-RXEND- .indication primitive.

16. The non-transitory computer-readable storage medium of claim 15, wherein the instructions further configure the one or more processors to:

if a PHY-RXSTART.indication primitive is received before the timeout duration, wait for a corresponding PHY-RXEND.indication primitive, and if a clear-to-send (CTS) frame is received from one of the HE stations before the corresponding PHY-RXEND.indication primitive, determine the transmission of the MU-RTS trigger frame was successful; and if another frame is received before the corresponding PHY-RXEND.indication primitive, determine that the transmission of the MU-RTS trigger frame has failed.

17. The non-transitory computer-readable storage medium of claim 15, wherein the timeout duration begins after a PHY-TXEND.confirm primitive is received for transmitting the MU-RTS trigger frame.

18. An apparatus of a high-efficiency (HE) station (STA), the apparatus comprising: memory; and, processing circuitry coupled to the memory, the processing circuitry configured to:

decode a trigger frame, the trigger frame comprising a type field indicating the trigger frame is a multi-user request-to-send (MU-RTS) trigger frame, the trigger frame further comprising indications of HE stations to solicit clear-to-send (CTS) frames to be transmitted by the HE stations in response to the MU-RTS trigger frame, and the trigger frame further comprising a network allocation vector (NAV) duration, the NAV duration indicating a transmission opportunity (TXOP) duration of a TXOP, wherein the MU-RTS does not indicate the HE STA;

set a NAV of the HE STA based on the NAV duration; and if no frame is detected by the HE STA in a timeout duration, reset the NAV of the HE STA, wherein the timeout duration is to start after the end of receiving the MU-RTS trigger frame, wherein the timeout duration is (2×a short interframe space (SIFS) Time (aSIFSTime))+(CTS Time)+a receive (Rx) physical (PHY) Start Delay (aRxPHYStartDelay)+(2×aSlotTime), and wherein the timeout duration begins after a PHY-RXEND.indication corresponding to an end of the reception of the MU-RTS trigger frame.

19. The apparatus of claim 18, wherein the processing circuitry is further configured to:

decode a basic service set (BSS) color of the MU-RTS trigger frame, wherein the MU-RTS trigger frame comprises an high efficiency (HE) signal A field that comprises the BSS color; and if the BSS color indicates a different color than a color of the HE STA, decode the MAC portion of the MU-RTS trigger frame.

20. The apparatus of claim 18, further comprising a transceiver coupled to the processing circuitry; and further comprising one or more antennas coupled to the transceiver.

* * * * *